July 28, 1959 J. G. HINSDALE 2,897,379

TRANSISTOR PHASE DISCRIMINATOR

Filed Oct. 25, 1956 3 Sheets-Sheet 1

INVENTOR.
JAMES G. HINSDALE,
BY Perry E. Turner
AGENT.

INVENTOR.
JAMES G. HINSDALE,
BY Perry E. Turner
AGENT

TIME →

INVENTOR.
JAMES G. HINSDALE,
BY Perry E. Turner
AGENT.

United States Patent Office 2,897,379

Patented July 28, 1959

2,897,379

TRANSISTOR PHASE DISCRIMINATOR

James G. Hinsdale, Scottsdale, Ariz., assignor to Lear, Incorporated, Santa Monica, Calif.

Application October 25, 1956, Serial No. 618,380

10 Claims. (Cl. 307—88.5)

This invention relates to discriminator circuits, and more particularly to an improved phase discriminator employing amplifying semi-conductors such as transistors.

Numerous discriminator circuits employing vacuum tubes are of course well known. A common arrangement among these prior art circuits employs split or dual load impedances in an output circuit, for which respective tubes respond to the same signal and reference voltages to control output voltages across the impedances. In such arrangements, the tubes have matched performance characteristics to insure their uniform operation during respective half cycles of the signal voltage. With the advent of transistors, it was found that the substitution of these devices in known circuits was not satisfactory for high stability, owing to the difficulty of obtaining matched transistors and keeping them matched over wide temperature ranges.

It is an object of this invention to provide a discriminator circuit having a high degree of stability, and in which the problem of matching electron devices is eliminated.

It is another object of this invention to provide a transistor discriminator wherein the output signal characteristics across split load impedances are controlled through the use of a single transistor, and in which low resistance is provided in the transistor base circuit to provide maximum stability.

It is a further object of this invention to provide an improved discriminator circuit employing split load impedances, and which employs fewer component parts than prior art discriminator circuits for controlling the output signal characteristics across such impedances.

Figure 2A:
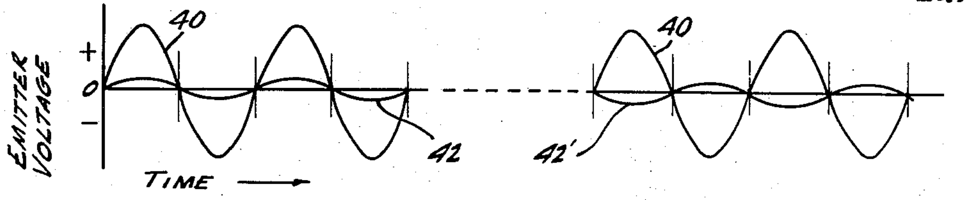
Figure 2B:
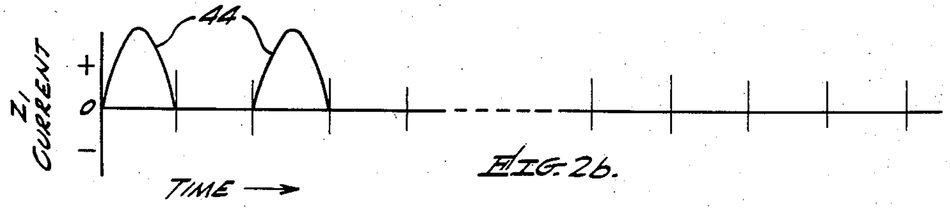
Figure 2C:
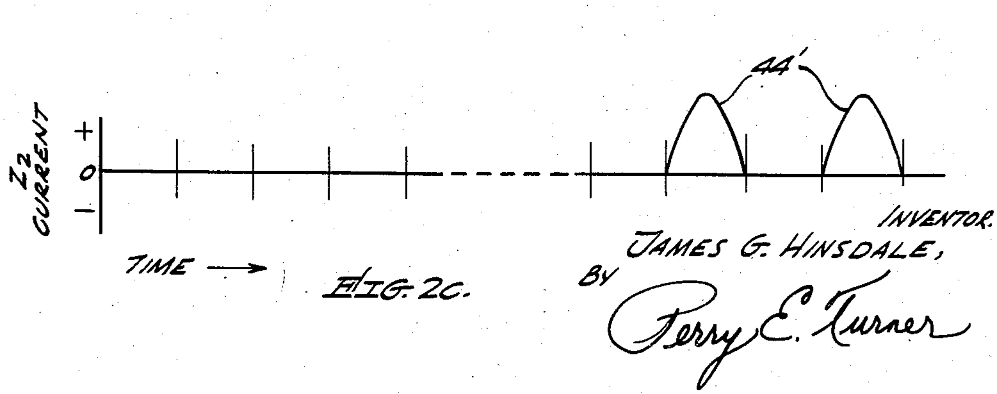
Figure 3:
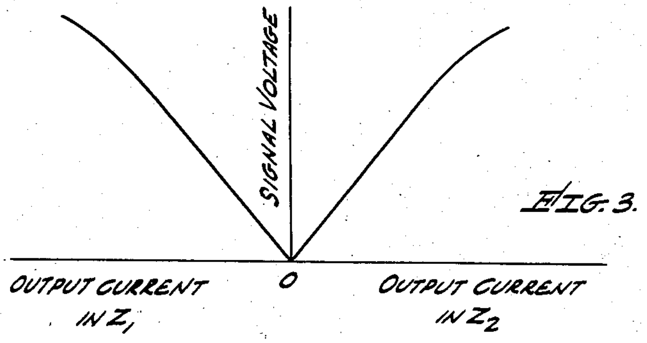
Figure 4:
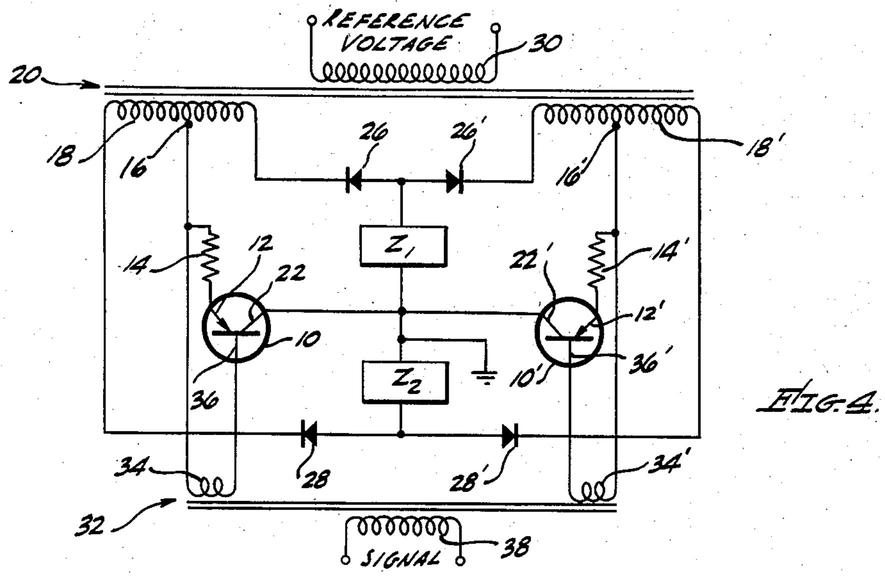
Figure 5A:
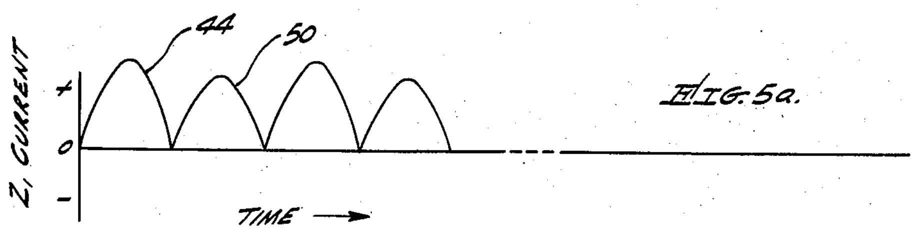
Figure 5B:
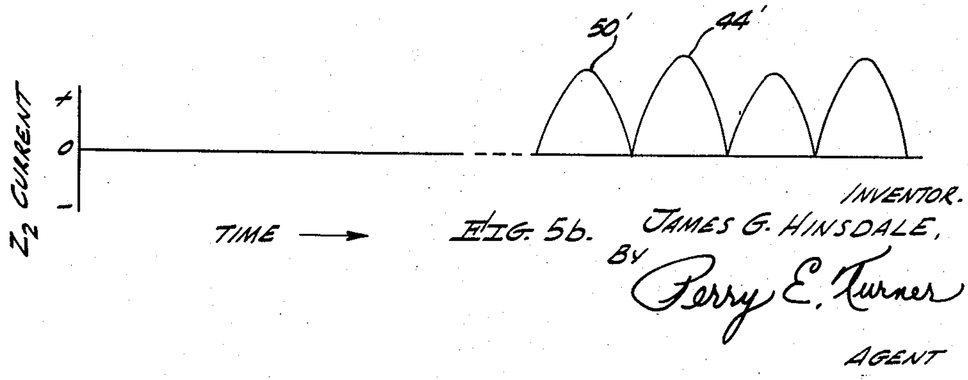
Figure 6:
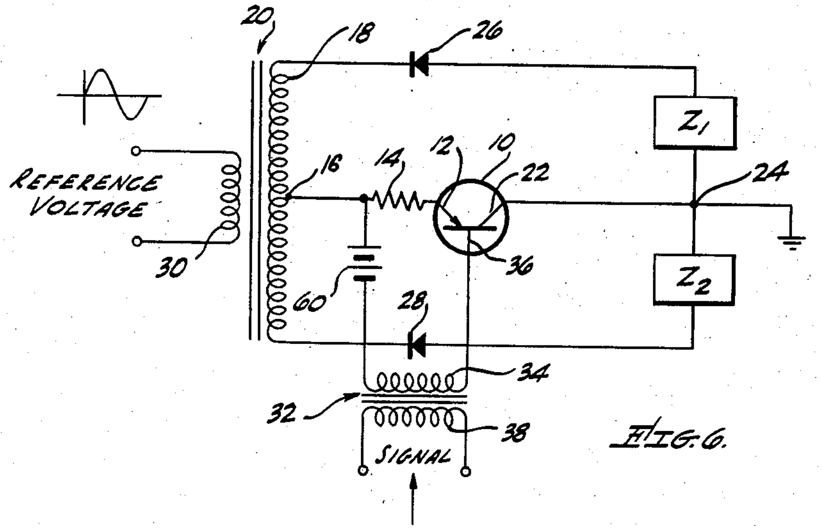
Figures 7A, 7B, 7C:
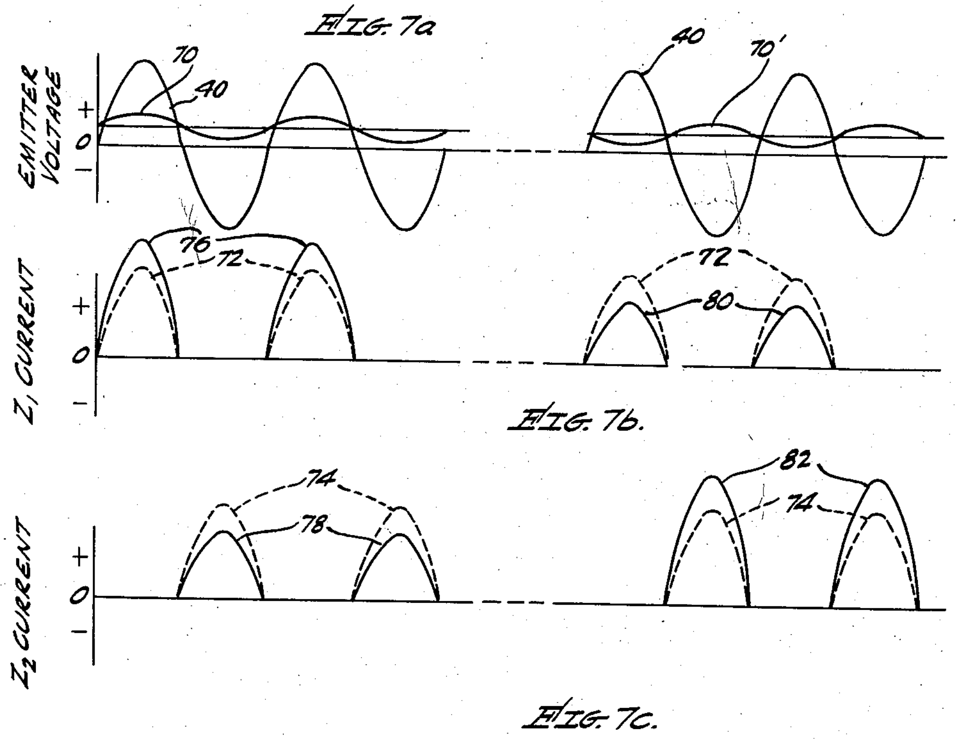

The above and other objects and advantages of this invention will be apparent from the following description, taken in conjunction with the accompanying drawings, in which a preferred embodiment of the invention is illustrated by way of example. The scope of the invention is pointed out in the appended claims. In the drawings, Fig. 1 is a schematic diagram illustrating a transistor discriminator in accordance with this invention, Figs. 2*a*, 2*b* and 2*c* illustrate waveforms to aid in explaining the operation of the discriminator of Fig. 1, Fig. 3 is a graph depicting output load current characteristics in relation to signal voltage, Fig. 4 is a schematic diagram of a discriminator network utilizing a pair of discriminators of the type shown in Fig. 1, further in accordance with this invention, Figs. 5*a* and 5*b* illustrate waveforms to aid in explaining the operation of the discriminator of Fig. 5, Fig. 6 is a schematic diagram, similar to Fig. 1, of another embodiment of the discriminator of this invention, and Figs. 7*a*, 7*b* and 7*c* illustrate waveforms to aid in explaining the operation of the discriminator of Fig. 6.

Briefly, the improved phase discriminator of this invention comprises a power amplification transistor having its collector electrode connected to the junction of two load impedances, and its emitter electrode connected to the center-tap of a reference voltage input transformer. Each end terminal of the secondary is coupled through a unidirectionally conductive device to a respective load impedance, and means are provided to apply a signal voltage across the emitter and base electrodes. Unidirectional current pulses flow through one load impedance when an applied signal voltage is in phase with the reference voltage, and through the other load impedance when the signal voltage is 180° out of phase with the reference voltage.

Figure 1:
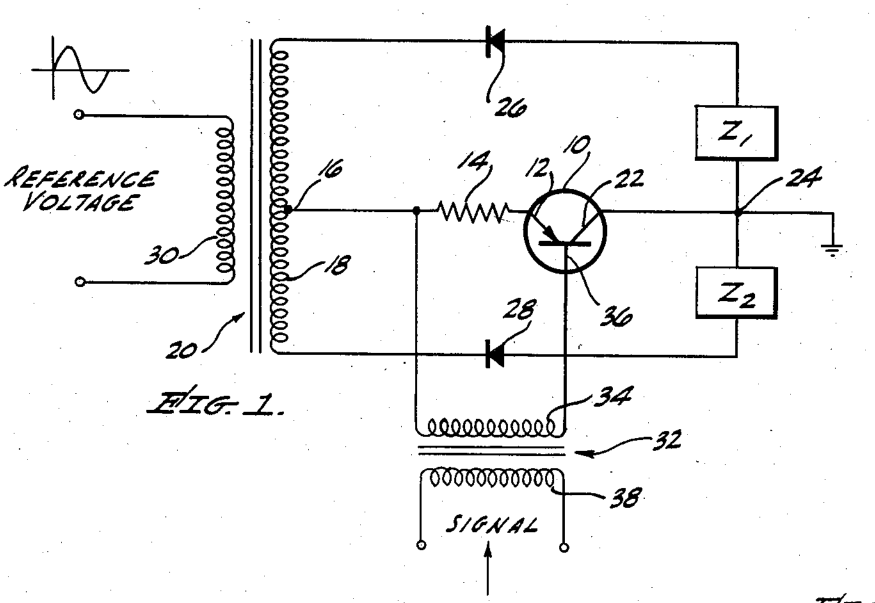

Referring to Fig. 1, a p-n-p power amplification junction transistor 10 has its emitter electrode 12 resistively connected, as through a resistor 14, to the center-tap 16 of the secondary winding of a transformer 20. The collector electrode 22 of transistor 10 is connected to the grounded junction 24 of a pair of load impedances $Z_1$ and $Z_2$. Each of the impedances $Z_1$, $Z_2$ is connected through respective unidirectional conductive devices, shown as diodes 26, 28, to the end terminals of secondary winding 18. As shown, the diodes are connected back-to-back, each being connected in the forward direction from the associated load impedance to the secondary winding. Thus, $Z_1$ and $Z_2$ are in respective parallel circuit branches, with the emitter-to-collector or current path of transistor 10 in the common leg of such circuit. The primary winding 30 of transformer 20 is adapted to receive a cyclical reference voltage, preferably sinusoidal, as indicated. A signal transformer 32 has its secondary winding 34 connected between the base electrode 36 of transistor 10 and center-tap 16. Signals applied to the primary winding 38 of transformer 32 are of the same frequency as the reference voltage and are either in phase or 180° out of phase with the reference voltage.

In operation, diodes 26, 28 are rendered alternately conducting by the reference voltage appearing across secondary winding 18. With transistor 10 a p-n-p type, emitter-to-collector current flow will occur where the signal voltages on the emitter are positive with respect to the base, i.e., on the positive half cycles of the signal. Assuming that the signal voltage 42 is in phase with the reference voltage 40 as shown in Fig. 2*a* at the left and that diode 26 is conductive during the positive half cycles of signal, current flows through $Z_1$; this current flow is indicated at 44 in Fig. 2*b*. No current flows through $Z_2$ under these conditions (see Fig. 2*c*), since on the half cycles when diode 28 is conductive, the base signal voltage is positive with respect to the emitter signal voltage.

The reverse of the above described operation takes place when the signal voltage 42' is 180° out of phase with the reference voltage 40, as indicated in Fig. 2*a* at the right. For the reasons above explained, no current flows through $Z_1$, but only through $Z_2$; the $Z_2$ current is indicated at 44' in Fig. 2*c*.

The respective collector currents, i.e., the currents through $Z_1$ and $Z_2$, are equal for signals of equal magnitude. This is illustrated in Fig. 3, wherein current variations through the respective load impedances are plotted for signals of varying magnitude. The impedance values of the loads determine the voltages across them, and their characteristics, i.e., whether capacitive, inductive or resistive, determine the output current-voltage relationships. It will be apparent that changes in current flow characteristics, which may accompany variation in temperature, will still effect the equal current flow through load impedances $Z_1$, $Z_2$ for signals of equal magnitude and opposite phase.

In the discriminator circuit of this invention, it is desirable that the stability factor of the circuit be low, i.e., that there be low impedance in the base circuit. The stability factor, $S_f$, is essentially the ratio between the sum of the D.-C. resistances in the base and emitter circuits, $R_e$ and $R_b$, and the D.-C. resistance in the emitter circuit, $R_e$. For low stability factor, a transformer input for the signals is preferred. In one practical embodiment, for example, a resistor 14 of eighteen ohms and a signal transformer having a secondary D.-C. resistance of ten ohms provided a stability factor, $$S_f=\frac{R_e+R_b}{R_e}=\frac{18+10}{18}=1.56$$

The lower the stability factor, the higher the stability of the circuit, and vice versa. For purposes of this invention, it is preferable that the stability factor be less than 2.0. It should be recognized, of course, that the resistances, $R_e$ and $R_b$, should be sufficiently larger than the internal transistor impedances to prevent the effects of such impedances from becoming significant.

It will be apparent that supplemental filtering would be needed to obtain a smooth D.-C. in the impedances $Z_1$ and $Z_2$, because of the spacing of the current pulses, particularly where inductive loads are used.

Fig. 4 illustrates a pair of identical circuits as above described for use in connection with the load impedances $Z_1$, $Z_2$, wherein current pulses are successive, and wherein filtering would automatically be effected by inductive loads. The corresponding parts of the second circuit, which is connected in parallel with the first, are shown by prime numbers. Referring to Figs. 5*a* and 5*b* along with Fig. 4, the secondary windings 34, 34' of signal transformer 32 are poled, as indicated, so the signal voltages applied to emitters 12, 12', and hence bases 36, 36', are of opposite polarity. Hence, on one half cycle of the input signal, one transistor 10 conducts and the other 10' is cut off. On the succeeding half cycle, transistor 10' conducts and transistor 10 is cut off. This results, for one phase relation of the signal and reference voltages, in successive D.-C. current pulses flowing through $Z_1$, succeeding ones 44, 50 (see Fig. 5*a*) being supplied through the respective transistors 10, 10'. Again, for this phase relation, no current flows through $Z_2$. Again, for signals of opposite phase, no current flows through $Z_1$, and successive D.-C. current pulses 50', 44' flow through $Z_2$.

It will be observed that current pulses 44, 44' are shown to be of different magnitude than the current pulses 50, 50'. Such conditions may exist because transistors 10, 10' are not identical in every respect. However, it will be observed that the current pulses 44, 50 and 50', 44' are symmetrical, and therefore the D.-C. levels of the sets of pulses are equal.

The circuit of this invention is ideally suited for use in a servo amplifier system. The input signal may come from a device, such as a gyroscope in an aircraft, which develops signals that are in phase or out of phase with a reference voltage, depending on the direction it departs from a balanced position. As previously suggested, the energizing coils of a pair of electromagnetic clutches, adapted when energized to operate a control surface, e.g., a rudder or elevator, may be the split load impedances $Z_1$, $Z_2$. Depending upon the position of the gyroscope, and hence the phase of the signals therefrom, one or the other of the clutches will be energized to effect operation of the control surface in a direction to return the gyroscope to its balanced position. Numerous other uses for the phase discriminator of this invention will be readily apparent.

Although the above circuit has been described for use with p-n-p transistors, it will be recognized that n-p-n transistors could be used. In this case, the diodes would be reversed.

As previously described, the current pulses are directed through one of the load impedances $Z_1$, $Z_2$ for a given phase relation (in phase or 180° out of phase) between the signal and reference voltages. The circuit of this invention, however, may be adapted for operation wherein current pulses flow through both loads, but with the greater current flowing through $Z_1$ and $Z_2$, respectively, for in-phase and 180° out-of-phase relations of the signal and reference voltages. Fig. 6 illustrates an embodiment of this latter type, and consists in inserting a D.-C. bias, indicated by battery 60, in series with the secondary winding 34 of signal transformer 32.

With the battery poled as indicated to establish emitter 12 more positive than base 36, it will be apparent that current pulses will flow through the respective load impedances on alternate half cycles; further, in the absence of a signal voltage, these current pulses obviously will be equal. Referring to Figs. 7*b* and 7*c*, dotted pulses 72 and 74 represent the pulses flowing through the respective load impedances.

A signal voltage appearing at the emitter 12 varies about a positive D.-C. bias level, as indicated at 70 in Fig. 7*a*. Where the signal voltage is in phase with the reference voltage, current pulses 76 (Fig. 7*b*) flowing through $Z_1$ will increase to a maximum, and alternate current pulses 78 (Fig. 7*c*) flowing through $Z_2$ will decrease to a minimum. Where the signal voltage 70' is 180° out of phase with the reference voltage, the current pulses through $Z_1$ and $Z_2$ will decrease and increase, respectively, as indicated at 80 and 82 in Figs. 7*b* and 7*c*. Thus, a resultant D.-C. voltage will obtain which represents the difference between the voltages developed across the respective load impedances $Z_1$, $Z_2$, and the sense of which represents the phase relation of the signal and reference voltages.

It will be apparent that the circuit of Fig. 6 will also operate as described if the emitter and collector connections were reversed and the battery 60 and secondary winding connected between the collector and base electrodes 22, 36. In such case, the transistor operates as an emitter follower, in which case the dynamic impedance while conducting is very low.

Also in Fig. 6, an n-p-n junction transistor could be used by reversing the diodes 26, 28 and the polarity of battery 60.

What is claimed is:

1. A phase discriminator comprising first and second load impedance elements each having a pair of terminals, one of each pair being connected to a point of reference potential, first and second unidirectionally conductive devices, a transformer including a secondary winding having end terminals and a center-tap, said first and second unidirectionally conductive devices being connected respectively between the end terminals of said secondary winding and the other terminals of said load impedance elements, said uni-directionally conductive devices being connected in back-to-back relation between said other terminals and said end terminals, a transistor having an emitter electrode, a base electrode and a collector electrode, means connecting said emitter electrode and collector electrodes between said center-tap and said point of reference potential, means to apply a reference alternating voltage of fixed frequency to said transformer and means to apply a cyclical signal voltage of said frequency between said base electrode and one of said emitter and collector electrodes.

2. The phase discriminator defined in claim 1, wherein said connecting means includes a resistive element connected between said center-tap and one of said emitter and collector electrodes.

3. The discriminator defined in claim 1, wherein said means to apply a signal voltage between said base electrode and one of said emitter and collector electrodes includes a load impedance element and D.-C. biasing means, and said load impedance element and D.-C. biasing means being connected in series between said base electrode and said one of said emitter and collector electrodes.

4. A phase discriminator comprising first and second parallel circuits, a load impedance element and a uni-directional conducting device in each of said circuits, said circuits having a common leg, an electron device having a current path in said common leg, means to apply a pulsating D.-C. voltage of fixed frequency and constant magnitude to said common leg, means to apply to said electron device a cyclical information voltage of half said fixed frequency, a half cycle of said cyclical information voltage coinciding in time with a D.-C. voltage pulse, whereby alternate half cycles of said cyclical information voltage are in phase with D.-C. voltage pulses and the succeeding half cycles are out of phase with the succeeding D.-C. voltage pulses, said current path being adapted to conduct current during the aforementioned in-phase half cycles of said cyclical information voltage, and means to effect conduction of current through said current path and one of said load impedance elements substantially throughout said in-phase half cycles of said cyclical information voltage.

5. The combination defined in claim 4, wherein said electron device is a transistor having emitter, base and collector electrodes, said emitter and collector electrodes being connected in said common leg, whereby said current path is the emitter-to-collector path in said transistor, wherein said means to apply said cyclical information voltage is coupled between said emitter and base electrodes, and wherein said means to effect conduction through said current path includes first and second uni-directionally conductive devices coupled respectively to the load impedance elements in the first and second parallel circuits, and means coupled to said first and second uni-directionally conductive devices to render them alternately conductive.

6. The combination defined in claim 5, wherein said means to apply said cyclical information voltage includes a transformer having a secondary winding connected between said emitter and base electrodes, a resistive element connected between said emitter electrode and one end of said secondary winding, and said resistive element and secondary winding having low values of D.-C. resistance such that the ratio of the sum thereof to the D.-C. resistance of said resistive element is less than 2:1.

7. A phase discriminator comprising first and second load impedance elements, a transistor having an emitter electrode, a base electrode and a collector electrode, first and second uni-directionally conductive devices, said uni-directionally conductive devices being connected respectively to said load impedance elements, said transistor having its emitter-to-collector path connected to said common terminal and to each of said uni-directionally conductive devices, whereby said load impedance elements are connected in parallel circuit branches and the emitter-to-collector path of said transistor is common to both branches, a source of reference voltage of predetermined frequency, means to effect alternate conduction of said uni-directionally conductive devices in response to said reference voltage, and means to apply a signal voltage of said predetermined frequency to said base electrode.

8. The phase discriminator defined in claim 7, wherein the signal applying means includes a load impedance means for receiving the signal voltage, said load impedance means being connected between said base electrode and one of the remaining electrodes, and means inserting a fixed D.-C. voltage in series with the signal voltage received by said load impedance means.

9. A phase distriminator comprising a transistor having an emitter electrode, a base electrode and a collector electrode, first and second load impedance devices, a common junction for said load impedance devices, said collector electrode being connected to said common junction, means to apply to said emitter electrode successive unidirectional voltage pulses of fixed repetition frequency, means to apply between said emitter electrode and said base electrode a cyclical signal of half said repetition frequency, whereby cyclical voltages at said emitter electrode are alternately positive and negative with respect to the cyclical voltages appearing at said base electrode, and means to effect emitter-to-collector current flow through said transistor and through one of said impedance elements when said emitter voltages are positive with respect to said base voltages.

10. A phase discriminator network comprising a first transformer having a primary winding and a pair of secondary windings to receive an alternating reference voltage of fixed frequency, each of said secondary windings having end terminals and a center-tap, a first pair of oppositely poled uni-directionally conductive devices connected between respective end terminals of said secondary windings, a second pair of oppositely poled uni-directionally conductive devices connected between the other end terminals of said secondary windings, a first load impedance element connected between the junction of said first pair of uni-directionally conductive devices and a point of reference potential, a second load impedance element connected between the junction of said second pair of uni-directionally conductive devices and said point of reference potential, first and second transistors each having an emitter electrode, a base electrode and a collector electrode, the collector electrodes of said transistors being connected to said point of reference potential, respective resistive elements connected between said emitter electrodes and said center-taps of said secondary windings, a second transformer having a primary winding and a pair of secondary windings to receive a cyclical signal voltage of said fixed frequency, and the secondary windings of said second transformer respectively being connected between said base electrodes and said center-taps.

References Cited in the file of this patent

UNITED STATES PATENTS

| | | |
|---|---|---|
| 2,695,381 | Darling | Nov. 23, 1954 |
| 2,698,392 | Herman | Dec. 28, 1954 |
| 2,767,365 | Guggi | Oct. 16, 1956 |
| 2,774,021 | Ehret | Dec. 11, 1956 |